United States Patent
Nubile et al.

(10) Patent No.: US 12,393,249 B2
(45) Date of Patent: Aug. 19, 2025

(54) PEAK POWER MANAGEMENT WITH DATA WINDOW RESERVATION

(71) Applicant: Micron Technology, Inc., Boise, ID (US)

(72) Inventors: Luca Nubile, Sulmona (IT); Walter Di Francesco, Avezzano (IT); Luigi Pilolli, L'Aquila (IT)

(73) Assignee: Micron Technology, Inc, Boise, ID (US)

(*) Notice: Subject to any disclaimer, the term of this patent is extended or adjusted under 35 U.S.C. 154(b) by 157 days.

(21) Appl. No.: 18/123,399

(22) Filed: Mar. 20, 2023

(65) Prior Publication Data

US 2023/0305616 A1 Sep. 28, 2023

Related U.S. Application Data

(60) Provisional application No. 63/322,332, filed on Mar. 22, 2022.

(51) Int. Cl.
*G06F 1/32* (2019.01)
*G06F 1/10* (2006.01)
*G06F 1/3225* (2019.01)

(52) U.S. Cl.
CPC ............. *G06F 1/3225* (2013.01); *G06F 1/10* (2013.01)

(58) Field of Classification Search
CPC .... G06F 1/3225; G06F 1/3275; G06F 3/0625; G06F 3/0659; G06F 3/0688
See application file for complete search history.

(56) References Cited

U.S. PATENT DOCUMENTS

| | | | | |
|---|---|---|---|---|
| 8,572,423 B1* | 10/2013 | Isachar | ................. | G06F 1/3225 |
| | | | | 713/340 |
| 9,418,712 B1* | 8/2016 | Erez | ...................... | G06F 1/3221 |
| 9,678,558 B2* | 6/2017 | Erez | ...................... | G06F 1/3268 |
| 10,331,193 B2* | 6/2019 | Ware | ....................... | G06F 1/324 |
| 10,862,825 B1* | 12/2020 | Gammel | ................ | H04L 47/78 |
| 11,567,560 B1* | 1/2023 | Ring | ..................... | G06F 1/324 |
| 2012/0290864 A1* | 11/2012 | Seroff | ................... | G06F 1/3268 |
| | | | | 713/340 |
| 2014/0143557 A1* | 5/2014 | Kuesel | .................... | H04L 12/10 |
| | | | | 713/300 |

(Continued)

*Primary Examiner* — Jaweed A Abbaszadeh
*Assistant Examiner* — Cheri L Harrington
(74) *Attorney, Agent, or Firm* — Lowenstein Sandler LLP

(57) ABSTRACT

A memory device includes memory dies, a first memory die of the memory dies including a memory array and control logic, operatively coupled with the memory array, to perform peak power management (PPM) operations including receiving a token from another memory die, in response to receiving the token, determining whether to reserve a data window during a token circulation time period having a first size determined based on a common clock signal shared among the memory dies and, in response to determining to reserve the data window, causing the data window to be reserved. The data window has a second size different from the first size determined based on the common clock signal. The operations further include causing a data frame to be generated within the data window. The data frame has a third size determined from the second size and includes current consumption information for the memory device.

18 Claims, 11 Drawing Sheets

(56) References Cited

U.S. PATENT DOCUMENTS

| | | | |
|---|---|---|---|
| 2014/0241096 A1* | 8/2014 | Yoshii | G11C 5/148 |
| | | | 365/227 |
| 2016/0116968 A1* | 4/2016 | Thangaraj | G06F 1/3268 |
| | | | 713/320 |
| 2016/0372160 A1* | 12/2016 | Lehmann | G11C 5/14 |
| 2017/0060459 A1* | 3/2017 | Kaczmarek | H03M 13/3761 |
| 2017/0109249 A1* | 4/2017 | Tatapudi | G11C 29/025 |
| 2017/0277243 A1* | 9/2017 | You | G06F 1/3228 |
| 2017/0277244 A1* | 9/2017 | You | G06F 21/83 |
| 2018/0335978 A1* | 11/2018 | Tidwell | G06F 1/28 |
| 2019/0341917 A1* | 11/2019 | Li | G01K 7/16 |
| 2020/0104062 A1* | 4/2020 | Cho | G06F 3/0619 |
| 2021/0055772 A1* | 2/2021 | Guo | G06F 1/3225 |
| 2021/0341988 A1* | 11/2021 | Chung | G06F 3/0659 |
| 2022/0253122 A1* | 8/2022 | Tang | G11C 16/30 |
| 2022/0413583 A1* | 12/2022 | Hassan | G06F 3/0688 |
| 2023/0134197 A1* | 5/2023 | Heinrich | G06F 1/12 |
| | | | 370/519 |

* cited by examiner

PEAK POWER MANAGEMENT WITH DATA WINDOW RESERVATION

RELATED APPLICATION

This application claims the benefit of U.S. Provisional Application 63/322,332, filed on Mar. 22, 2022, the entire contents of which are incorporated by reference herein.

TECHNICAL FIELD

Embodiments of the disclosure relate generally to memory sub-systems, and more specifically, relate to peak power management (PPM) with data window reservation.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
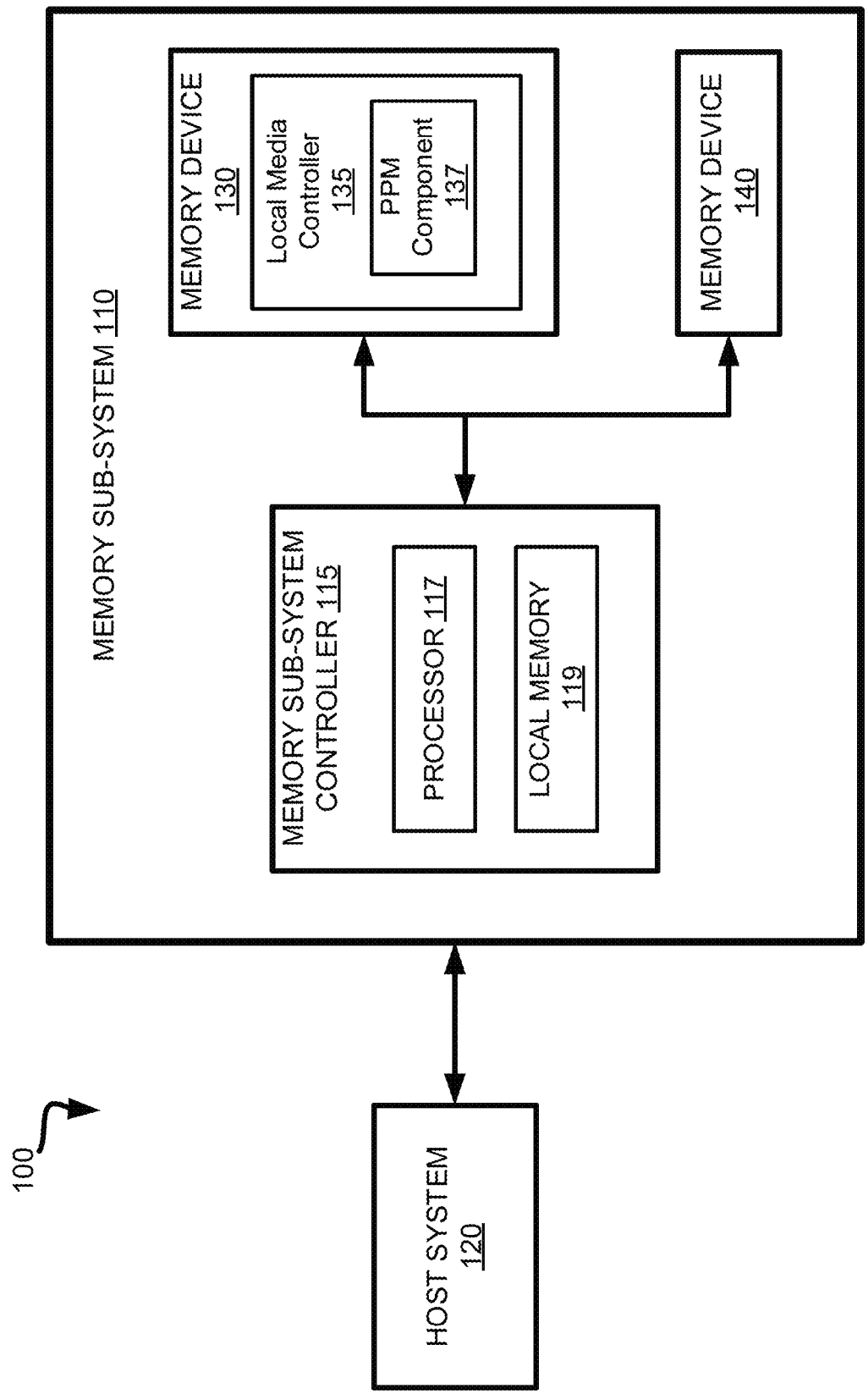
FIG. 1A illustrates an example computing system that includes a memory sub-system in accordance with some embodiments of the present disclosure.

Aspects of the present disclosure are directed to implementing peak power management with data window reservation. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device can include multiple bits arranged in a two-dimensional or three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types. For ease of description, these circuits can be generally referred to as independent plane driver circuits. Control logic on the memory device includes a number of separate processing threads to perform concurrent memory access operations (e.g., read operations, program operations, and erase operations). For example, each processing thread corresponds to a respective one of the memory planes and utilizes the associated independent plane driver circuits to perform the memory access operations on the respective memory plane. As these processing threads operate independently, the power usage and requirements associated with each processing thread also varies.

A memory device can be a three-dimensional (3D) memory device. For example, a 3D memory device can be a three-dimensional (3D) replacement gate memory device (e.g., 3D replacement gate NAND), which is a memory device with a replacement gate structure using wordline stacking. For example, a 3D replacement gate memory device can include wordlines, select gates, etc. located between sets of layers including a pillar (e.g., polysilicon pillar), a tunnel oxide layer, a charge trap (CT) layer, and a dielectric (e.g. oxide) layer. A 3D replacement gate memory device can have a "top deck" corresponding to a first side and a "bottom deck" corresponding to a second side. For example, the first side can be a drain side and the second side can be a source side. Data in a 3D replacement gate memory device can be stored as 1 bit/memory cell (SLC), 2 bits/memory cell (MLC), 3 bits/memory cell (TLC), etc.

The capacitive loading of 3D memory is generally large and may continue to grow as process scaling continues. Various access lines, data lines and voltage nodes can be charged or discharged very quickly during sense (e.g., read or verify), program, and erase operations so that memory array access operations can meet the performance specifications that are often required to satisfy data throughput targets as might be dictated by customer requirements or industry standards, for example. For sequential read or programming, multi-plane operations are often used to increase the system throughput. As a result, a typical memory device can have a high peak current usage, which might be four to five times the average current amplitude. Thus, with such a high average market requirement of total current usage budget, it can become challenging to concurrently operate more than a certain number of memory devices, such as four memory devices for example.

A variety of techniques have been utilized to manage power consumption of memory sub-systems containing multiple memory devices, many of which rely on a memory sub-system controller to stagger the activity of the memory devices seeking to avoid performing high power portions of access operations concurrently in more than one memory device. For example, in a memory package including multiple memory devices (e.g., multiple separate dies), there can be a peak power management (PPM) system. A PPM system implements a PPM communication protocol, which is an inter-memory-device (e.g. inter-die) communication protocol that can be used for limiting and/or tracking current or power consumed by the memory sub-system. Each memory device can include a PPM component (e.g., PPM manager) that exchanges information between its own local media controller (e.g., NAND controller) and the other PPM components of the PPM system via a communication bus. Each PPM component can be configured to perform power or current budget arbitration for the respective memory device. For example, each PPM component can implement predictive PPM to perform predictive power budget arbitration for the respective memory device.

The PPM communication protocol can employ a token-based round robin protocol, whereby each PPM component rotates as a holder of the token in accordance with a token circulation time period. Circulation of the token among the memory devices can be controlled by a common clock signal ("ICLK"). For example, the memory devices (e.g., dies) can include a designated primary memory device that generates the common clock signal received by each active PPM component. The token circulation time period can be defined by a number of clock cycles of the common clock signal, and the memory device can pass the token to the next memory device after the number of clock cycles has elapsed. For example, the token circulation time period can be defined by three clock cycles.

A memory device counter (e.g., die counter) can be used by each memory device to keep track of which memory device is holding the token. More specifically, the memory device counter can assign a memory device value to indicate the memory device that is currently holding the token. Each memory device counter value can be univocally associated with a respective memory device by utilizing a special PPM address for each memory device. The memory device counter can be updated upon the passing of the token to the next memory device.

While holding the token, the PPM component broadcasts, to the other memory devices, information codifying the amount of current used by its respective memory device during a given time period (e.g., a quantized current budget). The information can be broadcast using a data line. For example, the data line can be a high current (HC #) data line. The amount of information can be defined by a number of bits, where each bit corresponds to the logic level of a data line signal (e.g., an HC # signal) at a respective clock cycle (e.g., a bit has a value of "0" if the HC # signal is logic low during a clock cycle, or a value of "1" if the clock pulse is logic high during a clock cycle). For example, if a memory device circulates the token after three clock cycles, then the information can include three bits of information. More specifically, a first bit corresponds to the logic level of the HC # signal during a first clock cycle, a second bit corresponds to the logic level of the HC # signal during a second clock cycle, and a third bit corresponds to the logic level of the HC # signal during the third clock cycle. Accordingly, the token circulation time period (e.g., number of clock cycles) can be defined in accordance with the amount of information to be broadcast by a holder of the token (e.g., number of bits).

While holding the token, the PPM component can issue a new request for a certain amount of current for its respective memory device to consume to execute an operation. The system can have a designated maximum current budget, and at least a portion of the maximum current budget may be consumed by other memory devices during execution of previous operations ("current consumption"). Thus, an available current budget can be defined as the difference between the maximum current budget and the current consumption. If the amount of current of the new request is less than or equal to the available current budget, then the request is granted and the local media controller can cause the operation to be executed. Otherwise, if the amount of current of the new request exceeds the available current budget, then the local media controller can be forced to wait for enough current budget to be made available to execute the operation.

Each memory device can maintain the information broadcast by each memory device within respective registers, which enables each memory device to calculate the current consumption. For example, if there are four dies Die 0 through Die 3, each Die 0 through Die 3 can maintain information broadcast by Die 0 through Die 3 within respective registers designated for Die 0 through Die 3. Since each memory device maintains the maximum current budget the most updated current consumption, each memory device can calculate the available current budget. Accordingly, each memory device can determine whether there is a sufficient amount of available current budget for its local media controller to execute a new operation.

In some situations, the operation may be a priority operation (e.g., a priority read operation) that should be executed as soon as possible. If the priority operation will consume an amount of current in excess of the available current budget, then a number of different mechanisms can be put in place to allow for execution of the priority operation with less delay. For example, other operation(s) can be suspended and/or paused, which can free up current budget to allow the priority operation to be performed. The PPM component can employ a number of different techniques to allocate the requested current among the multiple processing threads of the respective memory device. Accordingly, PPM can enable increased memory sub-system bandwidth by allowing a number of operations to run concurrently without exceeding a current system budget.

In a typical token-based PPM communication protocol implementation, the token circulation time period is fixed so that each memory device broadcasts a fixed amount of information. For example, as described above, the token circulation time period can be three clock cycles for broadcasting three bit information. This means that increasing the amount of information (e.g., number of bits) broadcast by a memory device can have a negative impact on the token circulation time period and/or logic overhead. Furthermore, upon receiving the token, a memory device must broadcast its information regardless of whether there is a change to the current consumption since the last broadcast. This is inefficient, at least because it generates wasted information and wasted resource consumption (e.g., communication bus power consumption).

To illustrate these inefficiencies, assume that during an operation that is about 100 microseconds in length (e.g., a program loop), 278 total tokens are broadcast throughout the operation. Moreover, assume that the operation includes 11 sub-operations. Each sub-operation can be separated by a breakpoint, which defines a point during the operation at which the amount of current consumption changes. For example, a high current (HC) breakpoint can mark a change from lower current consumption to higher current consumption, and a low current (LC) breakpoint can mark a change from higher current consumption to lower current consumption. This means that the information broadcast when the memory device receives the token during execution of the sub-operation during periods of time outside of the breakpoints remains unchanged. Therefore, relevant information regarding changes in current consumption will be broadcast among 11 token periods of the 278 total token periods. In other words, only about 4% of the total information broadcast by the memory device during execution of the operation is relevant information, while the remaining about 96% of the total information broadcast by the memory device during execution of the operation is irrelevant ("garbage") information. Since the communication bus is busy communicating irrelevant information to the other memory devices for about 96% of the communication time during execution of the operation, about 96% of the communication bus power may be wasted during execution of the operation.

Aspects of the present disclosure address the above and other deficiencies by implementing peak power management (PPM) with data window reservation. For example, embodiments described herein provide for an improved PPM communication protocol that can reduce the amount of wasted information and wasted resource consumption, and/or can increase the amount of information (e.g., number of bits) that each memory device (e.g., die) can transmit within a memory sub-system.

For example, the PPM communication protocol described herein can implement a shorter token circulation time period. More specifically, the token circulation time period described herein can be less than three clock cycles of the common clock signal ("ICLK"). For example, in some embodiments, the token circulation time period is defined by a single clock cycle. The token circulation time period allows a memory device that is holding the token to reserve a data window of time ("data window") for broadcasting a data frame to the other memory devices during the data window.

The data window can be reserved by the memory device in a manner that broadcasts a notification of the data window reservation to the other memory devices. For example, reserving the data window can include setting the logic level of a data line signal (e.g., HC # signal) to a data window level (e.g., logic high). The data frame can include a number of bits, where the value of each bit reflects the logic level of the data line at a respective clock cycle of the data window (e.g., "0" for logic low and "1" for logic high). Thus, the data window can have a size defined by the number of clock cycles that are needed to obtain the desired number of bits for data frame. The size of the data window can be predefined, such that the other memory devices can, in response to receiving the notification of the data window reservation, update their respective memory device counters to reflect the reservation of the data window.

If a memory device does not reserve the data window within the token circulation time period (e.g., the data line signal is a logic low), this means that the memory device does not need to reserve the data window. The token can then be passed to the next memory device and the memory device counter is updated to indicate that the next memory device is holding the token. Otherwise, if the memory device reserves the data window, the memory device can then broadcast the data frame to the other memory devices. After the memory device broadcasts the data frame to the other memory devices at the end of the data window, the token can then be passed to the next memory device and the memory device counter can be updated to indicate that the next memory device is holding the token.

The data frame can include current consumption information for broadcasting the amount of current consumption for the memory device holding the token. For example, the current consumption information includes three bits of information, as described above. Besides achieving reduced PPM latency, the shorter token circulation time period can further achieve reduced power consumption since less irrelevant data is being broadcast to the other memory devices via the communication bus.

In some embodiments, the data frame is identically the current consumption information. However, the PPM communication protocol described herein can further leverage the PPM latency and power consumption savings achieved by reducing the shorter token circulation time period. For example, in some embodiments, the data frame can further include additional information, referred to as general-purpose information. The general-purpose information can include information related to implementing PPM and/or can include non-PPM related information (e.g., other synchronization information). In some embodiments, the general-purpose information can include five bits of information. Therefore, the size of the information can be defined by the size of the current consumption information and the size of the general-purpose information. For example, in embodiments in which the current consumption information includes three bits of information and the general-purpose information includes five bits of information, the total size of the information broadcast to the other memory devices is eight bits (i.e., one byte). In this example, the data window can then have a size defined by eight clock cycles, with three clock cycles for obtaining the three bits of current consumption information and five clock cycles for obtaining the five bits of general-purpose information.

Advantages of the present disclosure include, but are not limited to, improved memory device performance and QoS, as well as reduced resource consumption. For example, embodiments described herein can enable faster token circulation between memory devices (e.g., dies) of the memory sub-system. Illustratively, if the token circulation time period is defined by a single clock cycle, then token circulation period can be three times faster than three clock cycle implementations. As another example, embodiments described herein can increase the amount of information (e.g., number of bits) that each memory device (e.g., die) can transmit within a memory sub-system with negligible impact on token circulation and/or logic overhead. By increasing the amount of information that can be transmitted by each memory device, embodiments described herein can save transmission power.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 135) on the die and a controller (e.g., memory sub-system controller 115) for media management within the same memory device package. An example of a managed memory device is a managed NAND (MNAND) device.

The local media controller 135 can implement a peak power management (PPM) component 137 that can implement PPM with data window reservation. In such an embodiment, PPM component 137 can be implemented using hardware or as firmware, stored on memory device 130, executed by the control logic (e.g., local media controller 135) to perform the operations related to implementing PPM with data window reservation as described herein. In some embodiments, the memory sub-system controller 115 includes at least a portion of PPM component 137. For example, the memory sub-system controller 115 can include a processor 117 (e.g., a processing device) configured to execute instructions stored in local memory 119 for performing the operations described herein.

For example, the PPM component 137 can receive a token from a second memory device of the memory sub-system 110 (e.g., memory device 140). In response to receiving the token, the PPM component 137 can determine whether to reserve a data window during a token circulation time period having a first size determined based on a common clock signal shared among the plurality of memory dies. The data window is a period of time during which the PPM component 137 can generate a data frame including relevant information (e.g., current consumption information) to share with the other memory devices of the memory sub-system.

If the PPM component 137 determines to not reserve the data window, this means that the PPM component 137 does not have relevant information to share with the other memory devices of the memory sub-system 110. Thus, the PPM component 137 can pass the token to another memory device of the memory sub-system 110.

Otherwise, if the PPM component 137 determines to reserve the data window, this means that the PPM component 137 has relevant information to broadcast to the other memory devices of the memory sub-system 110. Thus, the PPM component 137 can cause the data window to be reserved. The data window has a second size different from the first size determined based on the common clock signal. Causing the data window to be reserved comprises causing a logic level of a signal of a data line to be set to a data window level.

In some embodiments, the first size includes a first number of clock cycles of the common clock signal, and the second size includes a second number of clock cycles of the common clock signal different from the first number of clock cycles. For example, the first size can be a single clock cycle of the common clock signal, and the second size can be at least three clock cycles of the common clock signal.

The PPM component 137 can cause a data frame to be generated within the data window. The data frame has a third size determined from the second size. For example, the data frame can include a set of bits, with each bit of the set of bits reflecting a logic level of the data line at a respective clock cycle of the data window. The data frame includes current consumption information for the memory device. In some embodiments, the data frame further includes general-purpose information. For example, the current consumption information can include three bits of information and the general-purpose information can include five bits of information, such that the data frame includes eight bits of information (i.e., one byte).

The PPM component 137 can cause the data frame to be broadcast to other memory devices of the memory sub-system 110, including the memory device 140. Each memory device of the memory sub-system 110 can include a register for storing the data frame. The PPM component 137 can then, in response to broadcasting the data frame, pass the token to another memory device of the memory sub-system 110. The PPM component of this memory device can then perform similar operations as those described above. Further details regarding the operations of the PPM component 137 will be described below with reference to FIGS. 5-8.

Figure 1B:
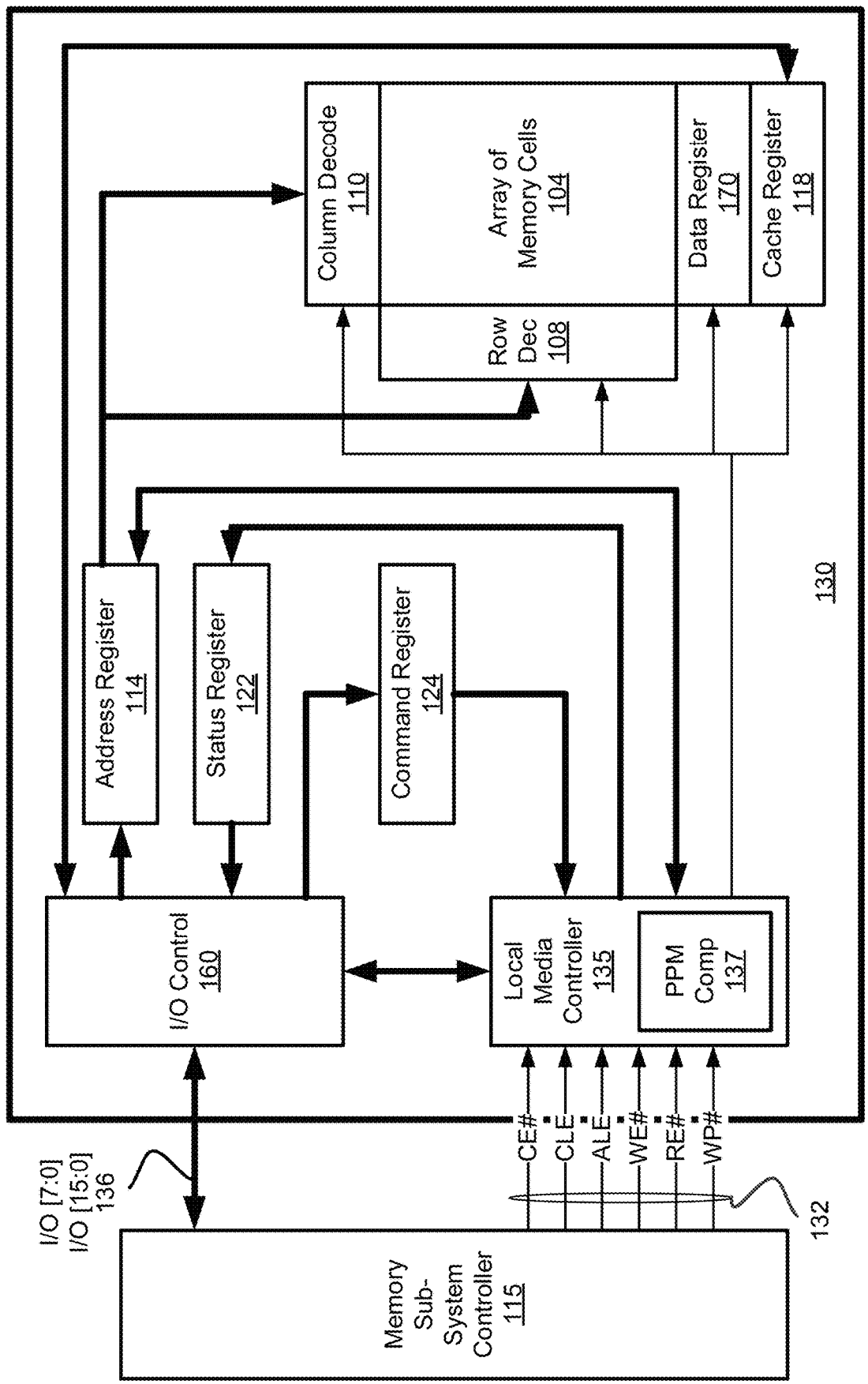
FIG. 1B is a block diagram of a memory device in communication with a memory sub-system controller of a memory sub-system in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 110 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 110 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 110 to control the row decode circuitry 108 and column decode circuitry 110 in response to the addresses. In one embodiment, local media controller 135 includes the PPM component 137, which can implement the defect detection described herein during an erase operation on memory device 130.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 204, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
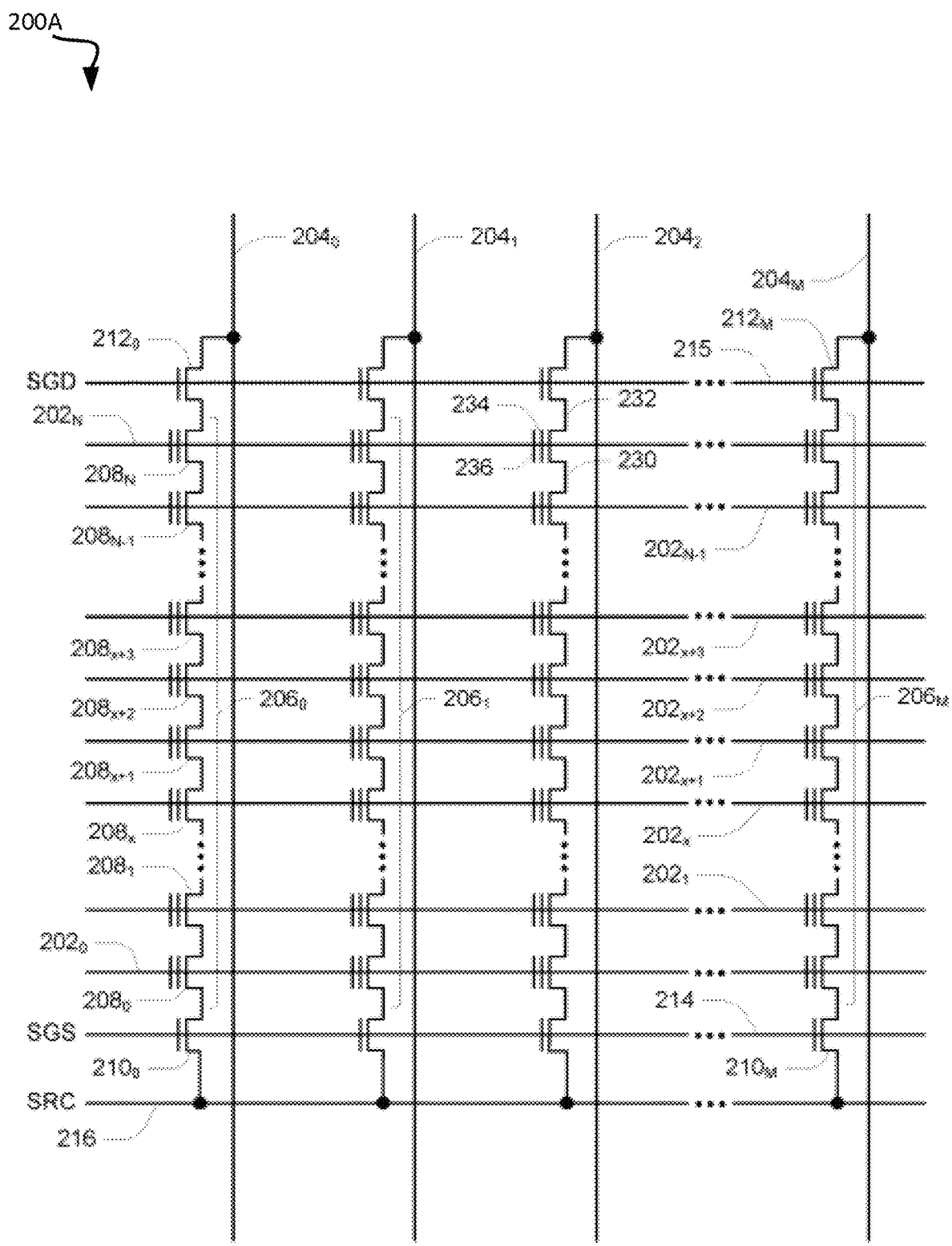
FIGS. 2A-2C are diagrams of portions of an example array of memory cells included in a memory device, in accordance with some embodiments of the present disclosure.
Figure 2B:
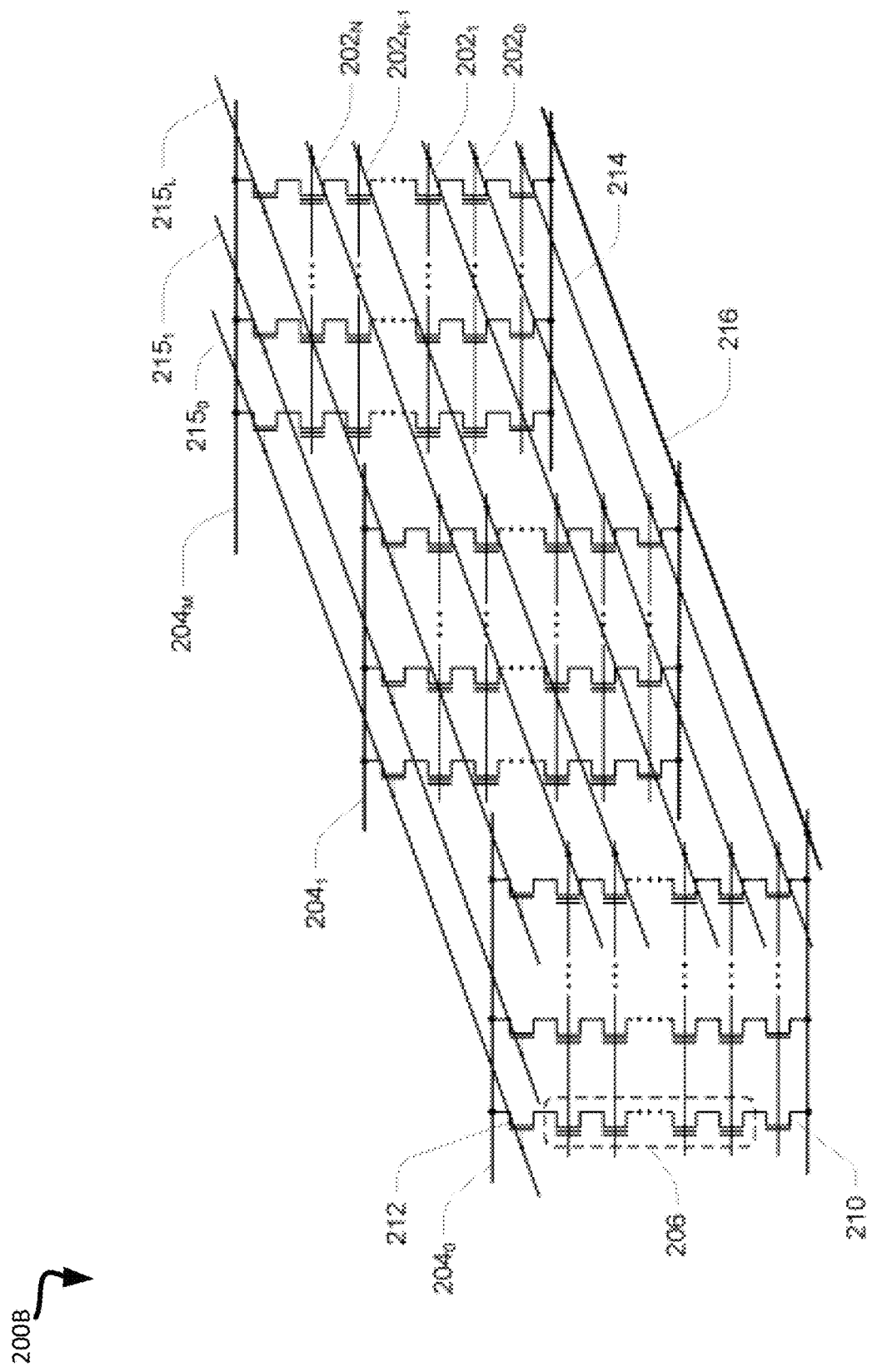
Figure 2C:
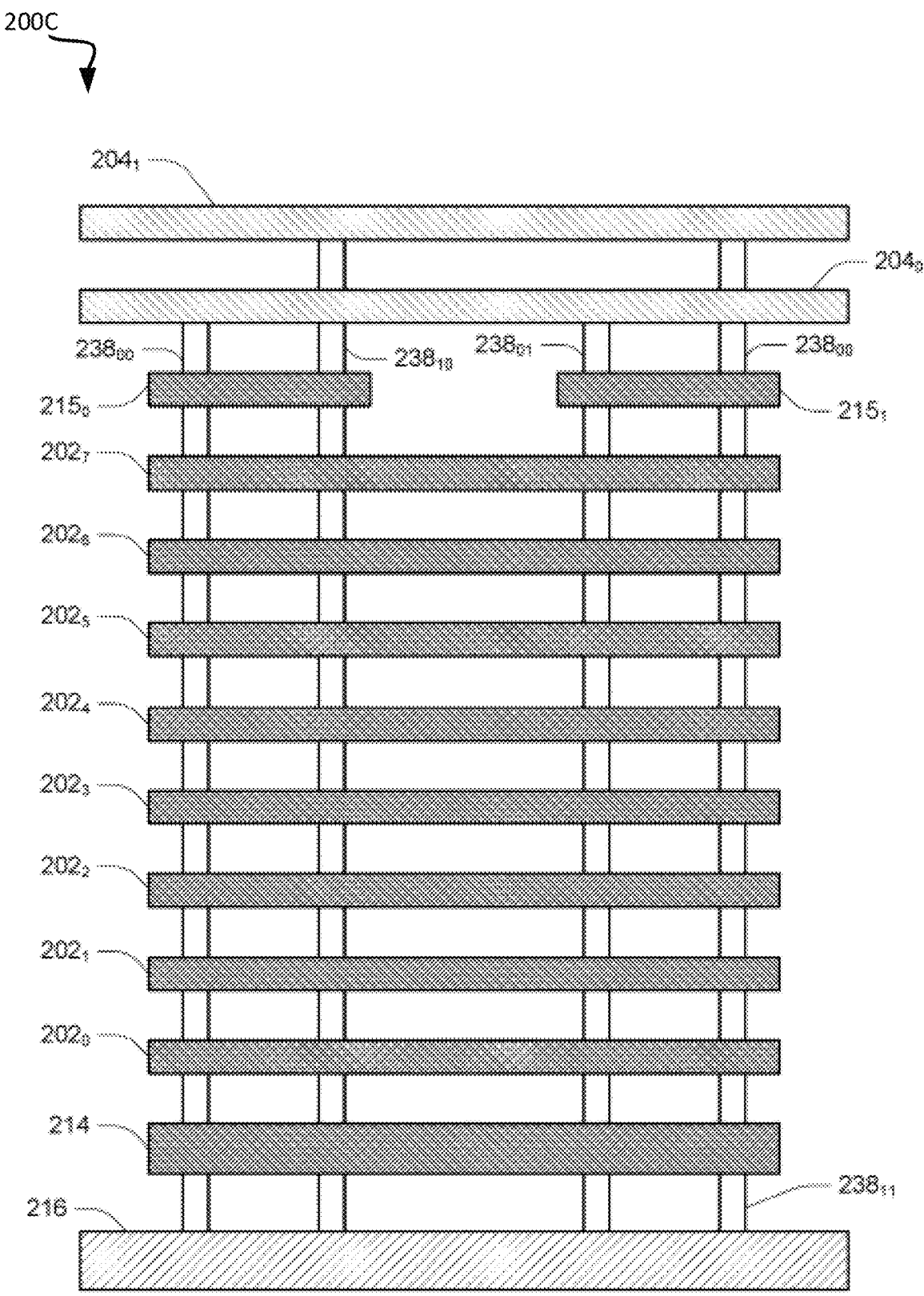

FIGS. 2A-2C are diagrams of portions of an example array of memory cells included in a memory device, in accordance with some embodiments of the present disclosure. For example, FIG. 2A is a schematic of a portion of an array of memory cells 200A as could be used in a memory device (e.g., as a portion of array of memory cells 104). Memory array 200A includes access lines, such as wordlines $202_0$ to $202_N$, and a data line, such as bitline 204. The wordlines 202 may be connected to global access lines (e.g., global wordlines), not shown in FIG. 2A, in a many-to-one relationship. For some embodiments, memory array 200A may be formed over a semiconductor that, for example, may be conductively doped to have a conductivity type, such as a p-type conductivity, e.g., to form a p-well, or an n-type conductivity, e.g., to form an n-well.

Memory array 200A can be arranged in rows each corresponding to a respective wordline 202 and columns each corresponding to a respective bitline 204. Rows of memory cells 208 can be divided into one or more groups of physical pages of memory cells 208, and physical pages of memory cells 208 can include every other memory cell 208 commonly connected to a given wordline 202. For example, memory cells 208 commonly connected to wordline $202_N$ and selectively connected to even bitlines 204 (e.g., bitlines $204_0$, $204_2$, $204_4$, etc.) may be one physical page of memory cells 208 (e.g., even memory cells) while memory cells 208 commonly connected to wordline $202_N$ and selectively connected to odd bitlines 204 (e.g., bitlines $204_1$, $204_3$, $204_5$, etc.) may be another physical page of memory cells 208 (e.g., odd memory cells). Although bitlines $204_3$-$204_5$ are not explicitly depicted in FIG. 2A, it is apparent from the figure that the bitlines 204 of the array of memory cells 200A may be numbered consecutively from bitline $204_0$ to bitline $204_M$. Other groupings of memory cells 208 commonly connected to a given wordline 202 may also define a physical page of memory cells 208. For certain memory devices, all memory cells commonly connected to a given wordline might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells may include those memory cells that are configured to be erased together, such as all memory cells connected to wordlines $202_0$-$202_N$ (e.g., all strings 206 sharing common wordlines 202). Unless expressly distinguished, a reference to a page of memory cells herein refers to the memory cells of a logical page of memory cells.

Each column can include a string of series-connected memory cells (e.g., non-volatile memory cells), such as one of strings $206_0$ to $206_M$. Each string 206 can be connected (e.g., selectively connected) to a source line 216 (SRC) and can include memory cells $208_0$ to $208_N$. The memory cells 208 of each string 206 can be connected in series between a select gate 210, such as one of the select gates $210_0$ to $210_M$, and a select gate 212, such as one of the select gates $212_0$ to $212_M$. In some embodiments, the select gates $210_0$ to $210_M$ are source-side select gates (SGS) and the select gates $212_0$ to $212_M$ are drain-side select gates. Select gates $210_0$ to $210_M$ can be connected to a select line 214 (e.g., source-side select line) and select gates $212_0$ to $212_M$ can be connected to a select line 215 (e.g., drain-side select line). The select gates 210 and 212 might represent a plurality of select gates connected in series, with each select gate in series configured to receive a same or independent control signal. A source of each select gate 210 can be connected to SRC 216, and a drain of each select gate 210 can be connected to a memory cell $208_0$ of the corresponding string 206. Therefore, each select gate 210 can be configured to selectively connect a corresponding string 206 to SRC 216. A control gate of each select gate 210 can be connected to select line 214. The drain of each select gate 212 can be connected to the bitline 204 for the corresponding string 206. The source of each select gate 212 can be connected to a memory cell $208_N$ of the corresponding string 206. Therefore, each select gate 212 might be configured to selectively connect a corresponding string 206 to the bitline 204. A control gate of each select gate 212 can be connected to select line 215.

In some embodiments, and as will be described in further detail below with reference to FIG. 2B, the memory array in FIG. 2A is a three-dimensional memory array, in which the strings 206 extend substantially perpendicular to a plane containing SRC 216 and to a plane containing a plurality of bitlines 204 that can be substantially parallel to the plane containing SRC 216.

FIG. 2B is another schematic of a portion of an array of memory cells 200B (e.g., a portion of the array of memory cells 104) arranged in a three-dimensional memory array structure. The three-dimensional memory array 200B may incorporate vertical structures which may include semiconductor pillars where a portion of a pillar may act as a channel region of the memory cells of strings 206. The strings 206 may be each selectively connected to a bit line $204_0$-$204_M$ by a select gate 212 and to the SRC 216 by a select gate 210. Multiple strings 206 can be selectively connected to the same bitline 204. Subsets of strings 206 can be connected to their respective bitlines 204 by biasing the select lines $215_0$-$215_L$ to selectively activate particular select gates 212 each between a string 206 and a bitline 204. The select gates 210 can be activated by biasing the select line 214. Each wordline 202 may be connected to multiple rows of memory cells of the memory array 200B. Rows of memory cells that are commonly connected to each other by a particular wordline 202 may collectively be referred to as tiers.

FIG. 2C is a diagram of a portion of an array of memory cells 200C (e.g., a portion of the array of memory cells 104). Channel regions (e.g., semiconductor pillars) $238_{00}$ and $238_{01}$ represent the channel regions of different strings of series-connected memory cells (e.g., strings 206 of FIGS. 2A-2B) selectively connected to the bitline $204_0$. Similarly, channel regions $238_{10}$ and $238_{11}$ represent the channel regions of different strings of series-connected memory cells (e.g., NAND strings 206 of FIGS. 2A-2B) selectively connected to the bitline $204_1$. A memory cell (not depicted in FIG. 2C) may be formed at each intersection of an wordline 202 and a channel region 238, and the memory cells corresponding to a single channel region 238 may collectively form a string of series-connected memory cells (e.g., a string 206 of FIGS. 2A-2B). Additional features might be common in such structures, such as dummy wordlines, segmented channel regions with interposed conductive regions, etc.

Figure 3:
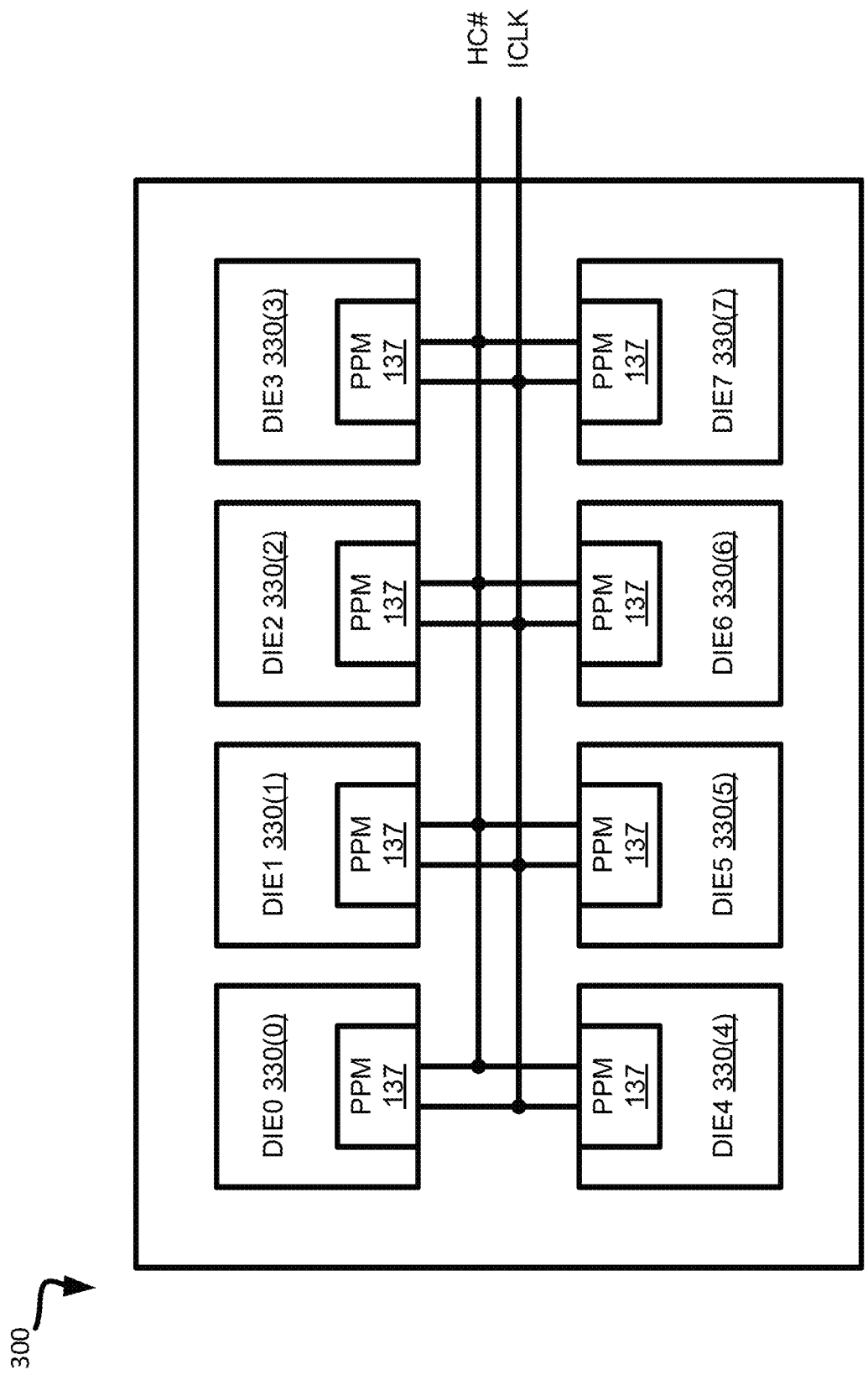
FIG. 3 is a block diagram illustrating a multi-die package with multiple memory dies in a memory sub-system, in accordance with some embodiments of the present disclosure.

FIG. 3 is a block diagram illustrating a multi-die package 300 with multiple memory dies in a memory sub-system, in accordance with some embodiments of the present disclosure. As illustrated, multi-die package 300 includes memory dies 330(0)-330(7). In other embodiments, however, multi-die package 300 can include some other number of memory dies, such as additional or fewer memory dies. In one embodiment, memory dies 330(0)-330(7) share a clock signal ICLK which is received via a clock signal line. Memory dies 330(0)-330(7) can be selectively enabled in response to a chip enable signal (e.g. via a control link), and can communicate over a separate I/O bus. In addition, a peak current magnitude indicator signal HC # is commonly shared between the memory dies 330(0)-330(7). The peak current magnitude indicator signal HC # an be normally pulled to a particular state (e.g., pulled high). In one embodiment, each of memory dies 330(0)-330(7) includes an instance of PPM component 137, which receives both the clock signal ICLK and the peak current magnitude indicator signal HC #.

In one embodiment, a token-based protocol is used where a token cycles through each of the memory dies 330(0)-330(7) for determining and broadcasting expected peak current magnitude, even though some of the memory dies 330(0)-330(7) might be disabled in response to their respective chip enable signal. The period of time during which a given PPM component 137 holds this token (e.g. a certain number of cycles of clock signal ICLK) can be referred to herein as a power management cycle of the associated memory die. At the end of the power management cycle, the token is passed to another memory die. Eventually the token is received again by the same PPM component 137, which signals the beginning of the power management cycle for the associated memory die. In one embodiment, the encoded value for the lowest expected peak current magnitude is configured such that each of its digits correspond to the normal logic level of the peak current magnitude indicator signal HC # where the disabled dies do not transition the peak current magnitude indicator signal HC #. In other embodiments, however, the memory dies can be configured, when otherwise disabled in response to their respective chip enable signal, to drive transitions of the peak current magnitude indicator signal HC # to indicate the encoded value for the lowest expected peak current magnitude upon being designated. When a given PPM component 137 holds the token, it can determine the peak current magnitude for the respective one of memory die 330(0)-330(7), which can be attributable to one or more processing threads on that memory die, and broadcast an indication of the same via the peak current magnitude indicator signal HC #. During a given power management cycle, the PPM component 137 can arbitrate among the multiple processing threads on the respective memory die using one of a number of different arbitration schemes in order to allocate that peak current to enable concurrent memory access operations.

Figure 4:
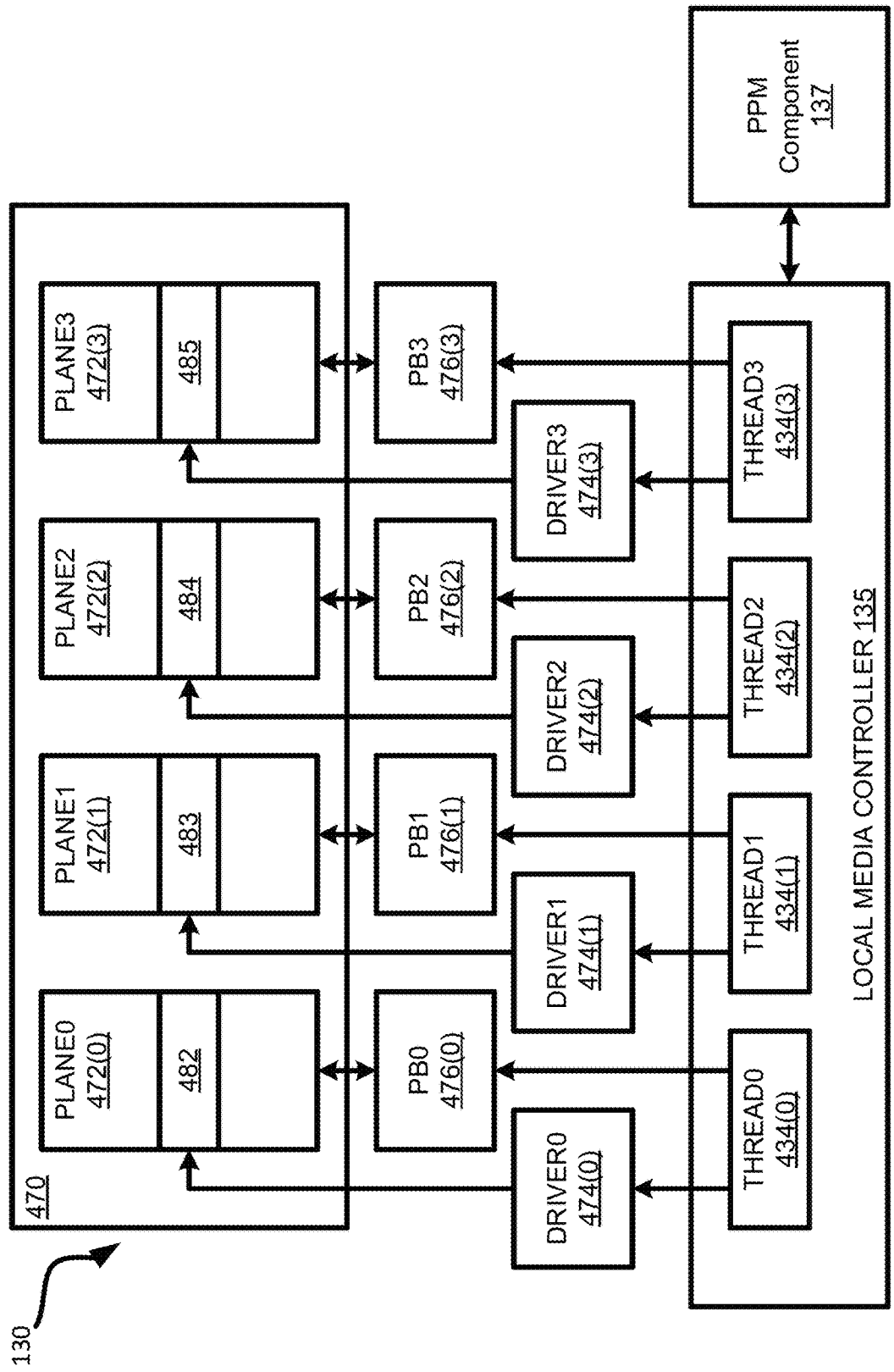
FIG. 4 is a block diagram illustrating a multi-plane memory device configured for independent parallel plane access, in accordance with some embodiments of the present disclosure.

FIG. 4 is a block diagram illustrating a multi-plane memory device 130 configured for independent parallel plane access, in accordance with some embodiments of the present disclosure. The memory planes 472(0)-472(3) can each be divided into blocks of data, with a different relative block of data from two or more of the memory planes 472(0)-472(3) concurrently accessible during memory access operations. For example, during memory access operations, two or more of data block 482 of the memory plane 472(0), data block 483 of the memory plane 472(1), data block 484 of the memory plane 372(2), and data block 485 of the memory plane 4372(3) can each be accessed concurrently.

The memory device 130 includes a memory array 470 divided into memory planes 472(0)-472(3) that each includes a respective number of memory cells. The multi-plane memory device 130 can further include local media controller 135, including a power control circuit and access control circuit for concurrently performing memory access operations for different memory planes 472(0)-472(3). The memory cells can be non-volatile memory cells, such as NAND flash cells, or can generally be any type of memory cells.

The memory planes 472(0)-472(3) can each be divided into blocks of data, with a different relative block of data from each of the memory planes 472(0)-472(3) concurrently accessible during memory access operations. For example, during memory access operations, data block 482 of the memory plane 472(0), data block 383 of the memory plane 472(1), data block 484 of the memory plane 472(2), and data block 385 of the memory plane 472(3) can each be accessed concurrently.

Each of the memory planes 472(0)-372(3) can be coupled to a respective page buffer 476(0)-476(3). Each page buffer 476(0)-376(3) can be configured to provide data to or receive data from the respective memory plane 472(0)-472(3). The page buffers 476(0)-476(3) can be controlled by local media controller 135. Data received from the respective memory plane 472(0)-472(3) can be latched at the page buffers 476(0)-476(3), respectively, and retrieved by local media controller 135, and provided to the memory sub-system controller 115 via the NVMe interface.

Each of the memory planes 472(0)-472(3) can be further coupled to a respective access driver circuit 474(0)-474(3), such as an access line driver circuit. The driver circuits 474(0)-474(3) can be configured to condition a page of a respective block of an associated memory plane 472(0)-472(3) for a memory access operation, such as programming data (i.e., writing data), reading data, or erasing data. Each of the driver circuits 474(0)-474(3) can be coupled to a respective global access lines associated with a respective memory plane 472(0)-472(3). Each of the global access lines can be selectively coupled to respective local access lines within a block of a plane during a memory access operation associated with a page within the block. The driver circuits 474(0)-474(3) can be controlled based on signals from local media controller 135. Each of the driver circuits 474(0)-474(3) can include or be coupled to a respective power circuit, and can provide voltages to respective access lines based on voltages provided by the respective power circuit. The voltages provided by the power circuits can be based on signals received from local media controller 135.

The local media controller 135 can control the driver circuits 474(0)-474(3) and page buffers 476(0)-476(3) to concurrently perform memory access operations associated with each of a group of memory command and address pairs (e.g., received from memory sub-system controller 115). For example, local media controller 135 can control the driver circuits 474(0)-474(3) and page buffer 476(0)-476(3) to perform the concurrent memory access operations. Local media controller 135 can include a power control circuit that serially configures two or more of the driver circuits 474(0)-474(3) for the concurrent memory access operations, and an access control circuit configured to control two or more of the page buffers 476(0)-476(3) to sense and latch data from the respective memory planes 472(0)-472(3), or program data to the respective memory planes 472(0)-472(3) to perform the concurrent memory access operations.

In operation, local media controller 135 can receive a group of memory command and address pairs via the NVMe or ONFI bus, with each pair arriving in parallel or serially. In some examples, the group of memory command and address pairs can each be associated with different respective memory planes 472(0)-472(3) of the memory array 470. The local media controller 135 can be configured to perform concurrent memory access operations (e.g., read operations or program operations) for the different memory planes 472(0)-472(3) of the memory array 470 responsive to the group of memory command and address pairs. For example, the power control circuit of local media controller 135 can serially configure, for the concurrent memory access operations based on respective page type (e.g., UP, TP, LP, XP, SLC/MLC/TLC/QLC page), the driver circuits 474(0)-474(3) for two or more memory planes 472(0)-472(3) associated with the group of memory command and address pairs. After the access line driver circuits 474(0)-474(3) have been configured, the access control circuit of local media controller 135 can concurrently control the page buffers 476(0)-476(3) to access the respective pages of each of the two or more memory planes 472(0)-472(3) associated with the group of memory command and address pairs, such as retrieving data or writing data, during the concurrent memory access operations. For example, the access control circuit can concurrently (e.g., in parallel and/or contemporaneously) control the page buffers 476(0)-476(3) to charge/discharge bitlines, sense data from the two or more memory planes 472(0)-472(3), and/or latch the data.

Based on the signals received from local media controller 135, the driver circuits 474(0)-474(3) that are coupled to the memory planes 472(0)-472(3) associated with the group of memory command and address command pairs can select blocks of memory or memory cells from the associated memory plane 472(0)-472(3), for memory operations, such as read, program, and/or erase operations. The driver circuits 474(0)-474(3) can drive different respective global access lines associated with a respective memory plane 472(0)-472(3). As an example, the driver circuit 474(0) can drive a first voltage on a first global access line associated with the memory plane 472(0), the driver circuit 474(1) can drive a second voltage on a third global access line associated with the memory plane 472(1), the driver circuit 474(2) can drive a third voltage on a seventh global access line associated with the memory plane 472(2), etc., and other voltages can be driven on each of the remaining global access lines. In some examples, pass voltages can be provided on all access lines except an access line associated with a page of a memory plane 472(0)-472(3) to be accessed. The local media controller 135, the driver circuits 474(0)-474(3) can allow different respective pages, and the page buffers 476(0)-476(3) within different respective blocks of memory cells, to be accessed concurrently. For example, a first page of a first block of a first memory plane can be accessed concurrently with a second page of a second block of a second memory plane, regardless of page type.

The page buffers 476(0)-476(3) can provide data to or receive data from the local media controller 135 during the memory access operations responsive to signals from the local media controller 135 and the respective memory planes 472(0)-472(3). The local media controller 135 can provide the received data to memory sub-system controller 115.

It will be appreciated that the memory device 130 can include more or less than four memory planes, driver circuits, and page buffers. It will also be appreciated that the respective global access lines can include 8, 16, 32, 64, 128, etc., global access lines. The local media controller 135 and the driver circuits 474(0)-474(3) can concurrently access different respective pages within different respective blocks of different memory planes when the different respective pages are of a different page type. For example, local media controller 135 can include a number of different processing threads, such as processing threads 434(0)-434(3). Each of processing threads 434(0)-434(3) can be associated with a respective one of memory planes 472(0)-472(3), or a respective group of memory planes, and can manage operations performed on the respective plane or group of planes. For example, each of processing threads 434(0)-434(3) can provide control signals to the respective one of driver circuits 474(0)-474(3) and page buffers 476(0)-476(3) to perform those memory access operations concurrently (e.g., at least partially overlapping in time). Since the processing threads 434(0)-434(3) can perform the memory access operations, each of processing threads 434(0)-434(3) can have different current requirements at different points in time. PPM component 137 can determine the power budget needs of processing threads 434(0)-334(3) in a given power management cycle and identify one or more of processing threads 434(0)-434(3) using one of a number of power budget arbitration schemes described herein. The one or more processing threads 434(0)-434(3) can be determined based on an available power budget in the memory sub-system 110 during the power management cycles. For example, PPM component 137 can determine respective priorities of processing threads 434(0)-434(3), and allocate current to processing threads 434(0)-434(3) based on the respective priorities.

Figure 5:
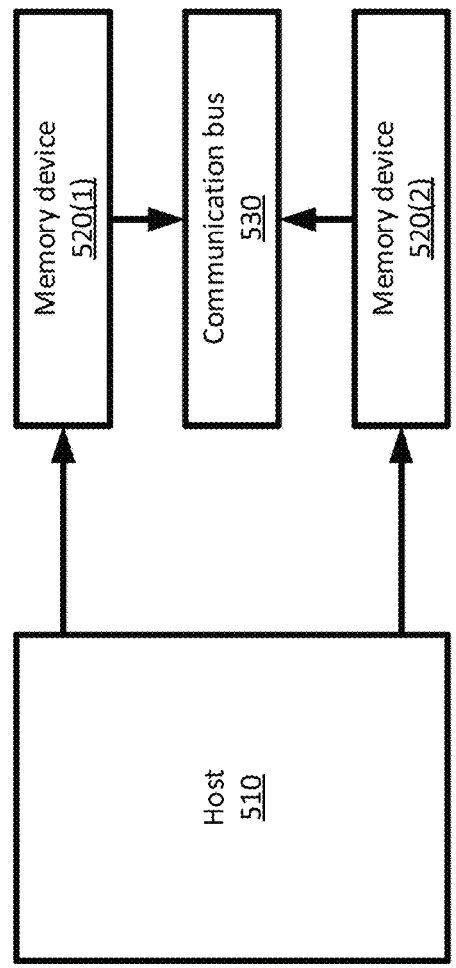
FIG. 5 is a block diagram of an example system illustrating an overview of an implementation of peak power management (PPM) with data window reservation, in accordance with some embodiments of the present disclosure.

FIG. 5 is a block diagram of an example system 500 illustrating an overview of an implementation of peak power management (PPM) with data window reservation, in accordance with some embodiments of the present disclosure. As shown, the system 500 includes a host 510 (e.g., the memory sub-system controller 115 of FIG. 1), a number of memory devices including memory device 520(1) and memory device 520(2), and a communication bus 530. In some embodiments, the individual memory devices include individual memory dies. Although only two memory devices are shown in FIG. 5, the system 500 can include any suitable number of memory devices.

The host 510 can initialize PPM having a PPM communication protocol. In some embodiments, the host 510 issues respective commands (e.g., set feature commands) to the memory devices to initialize PPM. The PPM communication protocol can be controlled by a common clock signal (ICLK). For example, one of the memory devices (e.g., memory device 520(1) or memory device 520(2)) can be designated as a primary memory device to control the common clock signal.

During PPM, the memory devices including memory device 520(1) and 520(2) can circulate a token via the communication bus 530 in accordance with a token circulation time period. The token circulation time period can be defined by a number of clock cycles of the common clock signal. In some embodiments, the token circulation time period is less than three clock cycles. For example, the token circulation time period can be a single clock cycle. The token circulation time period allows a memory device that is holding the token to reserve a data window of time ("data window") for broadcasting a data frame to the other memory devices during the data window.

For example, assume that memory device 520(2) has been passed the token (e.g., from memory device 520(1)), and has updated information to broadcast to the other memory devices (e.g., memory device 520(1)). The memory device 520(2) can reserve the data window in a manner that broadcasts a notification of the data window reservation the other memory devices. For example, reserving the data window can include setting the logic level of a data line signal (e.g., HC # signal) to a data window level (e.g., logic high). The data frame can include a number of bits, where the value of each bit reflects the logic level of the data line at a respective clock cycle of the data window (e.g., "0" for logic low and "1" for logic high). Thus, the data window can have a size defined by the number of clock cycles that are needed to obtain the desired number of bits for the data frame. The size of the data window can be predefined, such that the other memory devices (e.g. memory device 520(1)) can, in response to receiving the notification of the data window reservation, update their respective memory device counters to reflect the reservation of the data window.

The data frame can include current consumption information for broadcasting the amount of current consumption for the memory device holding the token. For example, the current consumption information includes three bits of information, as described above. Besides achieving reduced PPM latency, the shorter token circulation time period can further achieve reduced power consumption since less irrelevant data is being broadcast to the other memory devices via the communication bus.

In some embodiments, the data frame is identically the current consumption information. However, the PPM communication protocol described herein can further leverage the PPM latency and power consumption savings achieved by reducing the shorter token circulation time period. For example, in some embodiments, the data frame can further include additional information, referred to as general-purpose information. The general-purpose information can include information related to implementing PPM and/or can include non-PPM related information (e.g., other synchronization information). In some embodiments, the general-purpose information can include five bits of information. Therefore, the size of the information can be defined by the size of the current consumption information and the size of the general-purpose information. For example, in embodiments in which the current consumption information includes three bits of information and the general-purpose information includes five bits of information, the total size of the information broadcast by the memory device 520(2) to the other memory devices is eight bits (i.e., one byte). In this example, the data window can then have a size defined by eight clock cycles, with three clock cycles for obtaining the current consumption information and five clock cycles for obtaining the general-purpose information.

After the memory device 520(2) broadcasts the data frame to the other memory devices including memory device 520(1) at the end of the data window, the token can then be passed to the next memory device and the memory device counter can be updated to indicate that the next memory device is holding the token. Further details regarding implementing PPM with data window reservation will now be described below with respect to FIGS. 6-8.

Figure 6:
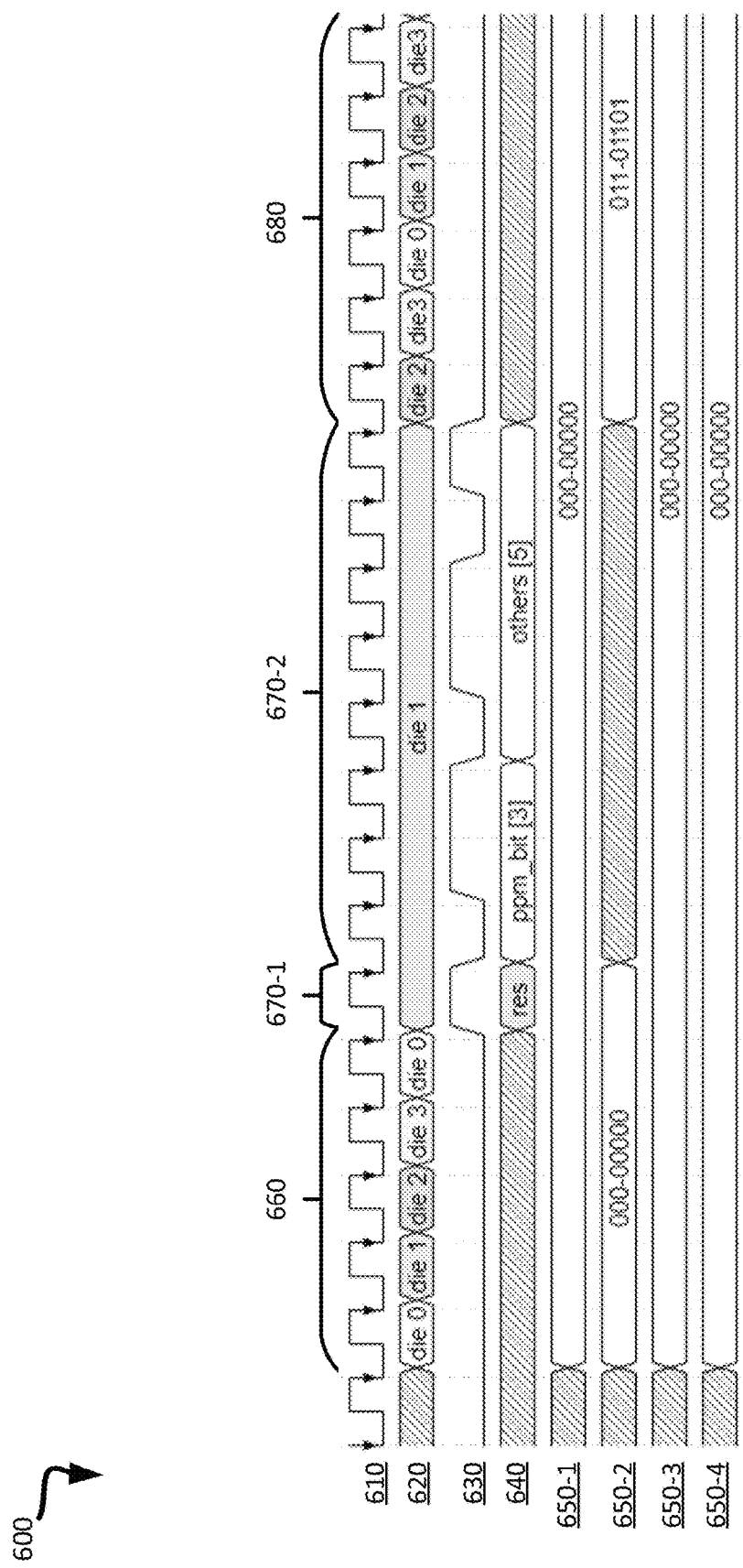
FIG. 6 is a diagram illustrating an example implementation of peak power management (PPM) with data window reservation, in accordance with some embodiments of the present disclosure.

FIG. 6 is a diagram 600 illustrating an example implementation of peak power management (PPM) with data window reservation, in accordance with some embodiments of the present disclosure. It is assumed that PPM is being implemented with respect to a PPM system including four memory devices. In this example, the memory devices are dies, including die 0, die 1, die 2 and die 3.

The diagram 600 includes a common clock signal line ("ICLK") 610, a memory device counter 620, a data signal line (e.g., HC # signal line) 630, data frame 640, a die 0 register 650-1, a die 1 register 650-2, a die 2 register 650-3 and a die 3 register 650-4. In this illustrative example, the data signal line 630 and the data frame 640 corresponds to die 1. Each of the registers 650-1 through 650-4 stores data frame information for at least its respective die. Each of the dies 0-3 can include a respective memory device counter 620.

The token circulation time period in this example is a single clock cycle, such that each of the dies has a single clock cycle to reserve a data window before passing the token to the next die. It is assumed that the token is passed in ascending order of die number, such that die 0 passes the token to die 1, die 1 passes the token to die 2, die 2 passes the token to die 3, and die 3 passes the token to die 1.

The diagram 600 includes a time period 660 during which none of the dies is reserving a data window. The diagram further includes a time period 670-1 during which die 1 is reserving a data window 670-2. The data window 670-2 can be reserved by die 1 in a manner that broadcasts a notification of the reservation of the data window 670-2 to dies 0, 2 and 3. For example, as shown, reserving the data window 670-2 can include setting the logic level of the signal of the data signal line 630 to a data window level (e.g., logic high). The data frame can include a number of bits, where the value of each bit reflects the logic level of the signal of the data signal line 630 at a respective clock cycle of the data window (e.g., "0" for logic low and "1" for logic high). Thus, the data window 670-2 can have a size defined by the number of clock cycles that are needed to obtain the desired number of bits for data frame. The size of the data window 670-2 can be predefined, such that the other dies 0, 2 and 3 can, in response to receiving the notification of the reservation of the data window 670-2, update their respective memory device counters 620 to reflect the reservation of the data window 670-2.

In this illustrative example, the data window 670-2 has a size of eight clock cycles and the data frame 640 has eight total bits of information. More specifically, the data frame 640 includes three bit current consumption information ("ppm_bit [3]") and five bit current consumption information ("others [5]"). The value of each bit in the data frame 640 to be stored in the registers (e.g. register 650-2) is determined by the logic level of the signal of the data signal line 630. For example, as shown, the current consumption information can be defined by "011" and the general-purpose information can be defined by "01101". After die 1 broadcasts the data frame 640 to dies 0, 2 and 3 at the end of the data window 670-2, the token can then be passed to die 2 to initiate a time period 680 during which the token keeps circulating among the dies until one of the dies reserves a data window. Moreover, each of the memory device counters 620 can be updated to indicate that die 2 is holding the token.

Figure 7:
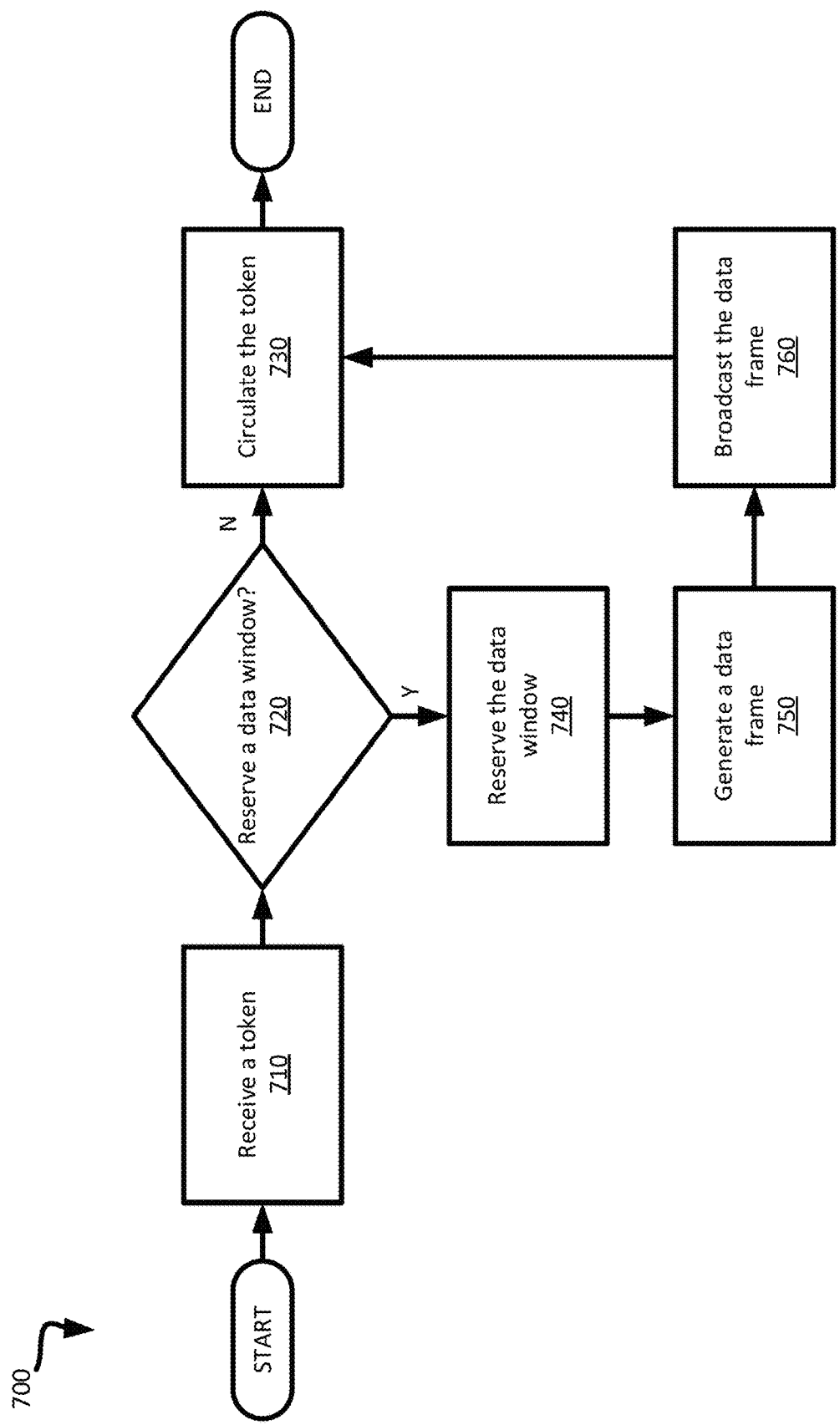
FIG. 7 is a flow diagram of a method to implement peak power management (PPM) with data window reservation, in accordance with some embodiments of the present disclosure.

FIG. 7 is a flow diagram of a method 700 to implement peak power management (PPM) with data window reservation, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the PPM component 137 of FIGS. 1A and 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, a token is received. For example, processing logic (e.g., the PPM component 137 of one memory device in a PPM system) can receive the token from another memory device of the PPM system, which includes a number of memory devices. In some embodiments, the memory devices include dies. The PPM system can further include a communication bus operatively coupled to each of the memory devices to enable communication among the memory devices. For example, the communication bus can be used to circulate the token among the memory devices (e.g., the token can be received via the communication bus).

At operation 720, it is determined whether to reserve a data window. For example, the processing logic can determine whether to reserve the data window during a token circulation time period. The token circulation time period can have a size determined based on a common clock signal shared among the memory devices of the PPM system. For example, the common clock signal can be controlled by a designated primary memory device. In some embodiments, the token circulation period is a single clock cycle.

In one embodiment, the PPM component 137 can determine whether to reserve the data window by determining whether new information is available to broadcast to the other memory devices within the PPM system. If it is determined that a data window should not be reserved (i.e., because no new information is available), then the token is circulated at operation 730. For example, the processing logic can pass the token to the next memory device at the end of the token circulation period. The token can be passed to the next memory device via the communication bus. Passing the token can include updating the memory device counter. The token circulation time period can then restart, such that the next memory device has the token circulation time period (e.g., a single clock cycle) to determine whether to reserve a data window for itself in accordance with the method 700.

Otherwise, if it is determined that a data window should be reserved (i.e., because new relevant information is available for broadcasting), the data window is reserved at operation 740. For example, the processing logic can cause the data window to be reserved. Causing the data window to be reserved can include causing the logic level of a signal of a data line (e.g., HC # signal) to be set to a data window level (e.g., logic high). The data window has a size different from the size of the token circulation time period. For example, the size of the data window can be greater than the size of the token circulation time period. In some embodiments, the data window has a size of eight clock cycles. However, the data window can have any suitable size in accordance with the embodiments described herein. The size of the data window can be predefined, such that the other memory devices can, in response to receiving the notification of the data window reservation, update their respective memory device counters to reflect the reservation of the data window.

At operation 750, a data frame is generated. For example, the processing logic can cause the data frame to be generated within the data window. The data frame can include a number of bits, where the value of each bit reflects the logic level of the data line at a respective clock cycle of the data window (e.g., "0" for logic low and "1" for logic high). Thus, the size of the data window can be proportional to the size of the data frame. For example, the size of the data window can be defined as the number of clock cycles that are needed to obtain the desired number of bits for data frame. Accordingly, the data frame generation can be complete after the final clock cycle of the data window.

In some embodiments, the data frame includes current consumption information indicating an amount of current being consumed by the memory device. In some embodiments, the data frame can further include general-purpose information. The general-purpose information can include information related to implementing PPM and/or can include non-PPM related information (e.g., other synchronization information). Therefore, the size of the information can be defined by the size of the current consumption information and the size of the general-purpose information. For example, in embodiments in which the current consumption information includes three bits of information and the general-purpose information includes five bits of information, the total size of the information broadcast to the other memory devices is eight bits (i.e., one byte). In this example, the data window can then have a size defined by eight clock cycles, with three clock cycles for obtaining the three bits of current consumption information and five clock cycles for obtaining the five bits of general-purpose information.

At operation 760, the data frame is broadcast. For example, the processing logic can cause the data frame to be broadcast to the other memory devices of the PPM system. Each memory device of the PPM system can include a register for storing data frame information for each of the memory devices of the PPM system. Thus, the data frame can be stored in each of the registers. After broadcasting the data frame, the process can revert to operation 730 to circulate the token. Further details regarding operations 710-760 are described above with reference to FIGS. 1A, 1B and 5-6.

Figure 8:
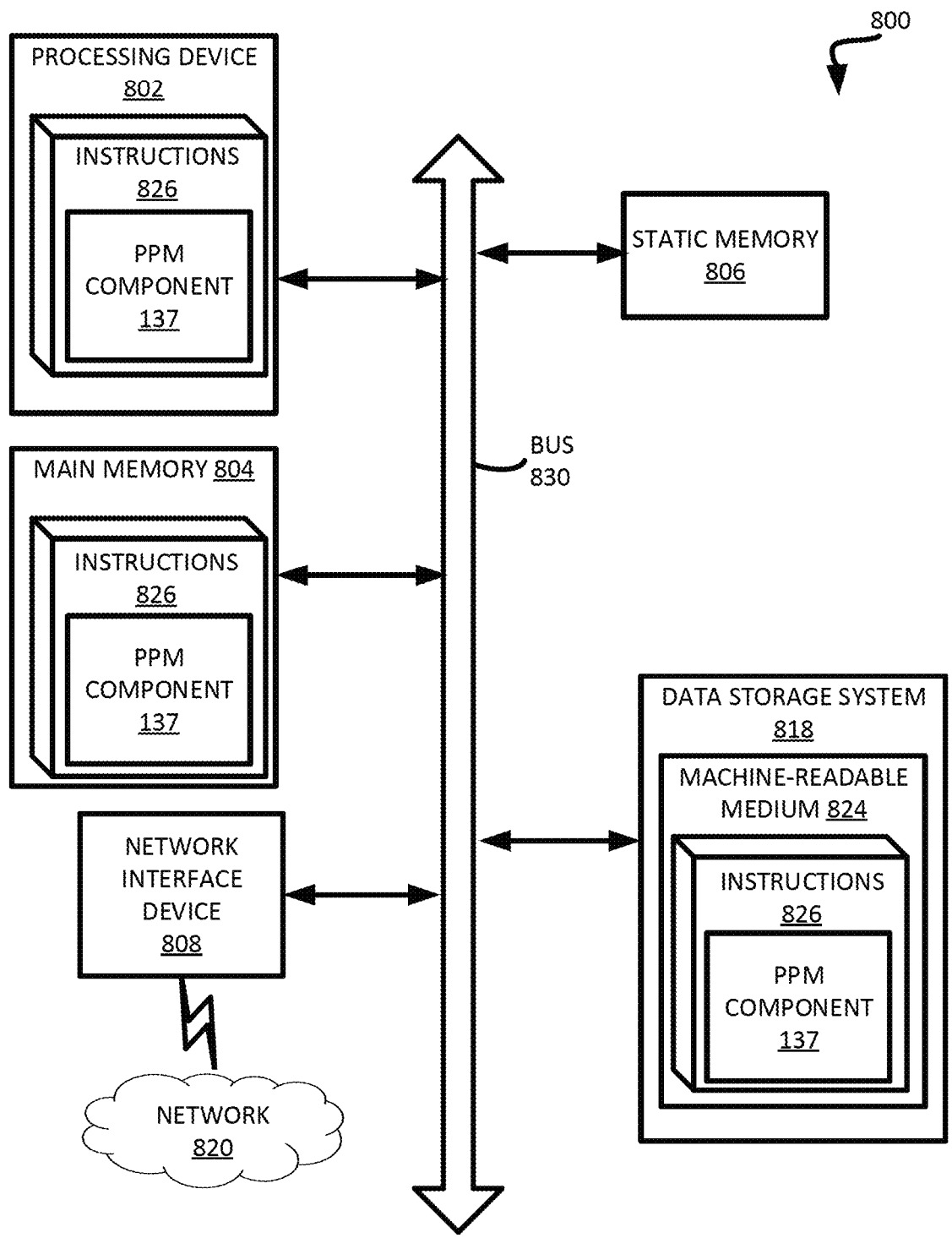
FIG. 8 is a block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the PPM component 137 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or RDRAM, etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a PPM component (e.g., the PPM component 137 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
a plurality of memory dies, a first memory die of the plurality of memory dies comprising;

a memory array; and
control logic, operatively coupled with the memory array, to perform peak power management (PPM) operations comprising:
receiving a token from a second memory die of the plurality of memory dies;
in response to receiving the token, determining whether to reserve a data window during a token circulation time period for broadcasting a data frame comprising current consumption information to at least the second memory die, the token circulation time period having a first size determined based on a single clock cycle of a common clock signal shared among the plurality of memory dies;
in response to determining to reserve the data window, causing the data window to be reserved, wherein the data window has a second size different from the first size determined based on the single clock cycle of the common clock signal; and
causing the data frame to be generated within the data window, wherein the data frame has a third size determined from the second size.

2. The memory device of claim 1, wherein the second size is at least three clock cycles of the common clock signal.

3. The memory device of claim 1, wherein causing the data window to be reserved comprises causing a logic level of a signal of a data line to be set to a data window level, and wherein the data frame comprises a set of bits, each bit of the set of bits reflecting a logic level of the data line at a respective clock cycle of the data window.

4. The memory device of claim 1, wherein the data frame further comprises general-purpose information.

5. The memory device of claim 1, wherein the operations further comprise:
causing the data frame to be broadcast to other memory dies of the plurality of memory dies; and
in response to causing the data frame to be broadcast, passing the token to a third memory die of the plurality of memory dies.

6. The memory device of claim 1, wherein each memory die of the plurality of memory dies further includes a register for storing the data frame.

7. A method for performing peak power management (PPM) operations in a memory device, the method comprising:
receiving, by a processing device of a first memory device of a plurality of memory devices, a token from a second memory device of the plurality of memory devices;
in response to receiving the token, determining, by the processing device, whether to reserve a data window during a token circulation time period for broadcasting a data frame comprising current consumption information to at least the second memory device, the token circulation time period having a first size determined based on a single clock cycle of a common clock signal shared among the plurality of memory devices;
in response to determining to reserve the data window, causing, by the processing device, the data window to be reserved, wherein the data window has a second size different from the first size determined based on the single clock cycle the common clock signal; and
causing, by the processing device, the data frame to be generated within the data window, wherein the data frame has a third size determined from the second size.

8. The method of claim 7, wherein the second size is at least three clock cycles of the common clock signal.

9. The method of claim 7, wherein causing the data window to be reserved comprises causing a logic level of a signal of a data line to be set to a data window level, and wherein the data frame comprises a set of bits, each bit of the set of bits reflecting a logic level of the data line at a respective clock cycle of the data window.

10. The method of claim 7, wherein the data frame further comprises general-purpose information.

11. The method of claim 7, further comprising:
causing, by the processing device, the data frame to be broadcast to other memory devices of the plurality of memory devices; and
in response to causing the data frame to be broadcast, passing, by the processing device, the token to a third memory device of the plurality of memory devices.

12. The method of claim 7, wherein the data frame is stored in a register within each memory device of the plurality of memory devices.

13. A non-transitory computer-readable storage medium comprising instructions that, when executed by a processing device of a first memory device of a plurality of memory devices, cause the processing device to perform operations comprising:
receiving a token from a second memory device of the plurality of memory devices;
in response to receiving the token, determining whether to reserve a data window during a token circulation time period for broadcasting a data frame comprising current consumption information to at least the second memory device, the token circulation time period having a first size defined by a single clock cycle of a common clock signal shared among the plurality of memory devices; and
in response to determining not to reserve the data window, passing the token to a third memory device of the plurality of memory devices.

14. The non-transitory computer-readable storage medium of claim 13, wherein the operations further comprise:
in response to determining to reserve the data window, causing the data window to be reserved, wherein the data window has a second size defined by at least three clock cycles of the common clock signal; and
causing a data frame to be generated within the data window, wherein the data frame has a third size determined from the second size.

15. The non-transitory computer-readable storage medium of claim 14, wherein causing the data window to be reserved comprises causing a logic level of a signal of a data line to be set to a data window level, and wherein the data frame comprises a set of bits, each bit of the set of bits reflecting a logic level of the data line at a respective clock cycle of the data window.

16. The non-transitory computer-readable storage medium of claim 14, wherein the data frame further comprises general-purpose information.

17. The non-transitory computer-readable storage medium of claim 14, wherein the operations further comprise:
causing the data frame to be broadcast to other memory devices of the plurality of memory devices; and
in response to causing the data frame to be broadcast, passing the token to a next memory device of the plurality of memory devices.

18. The non-transitory computer-readable storage medium of claim 14, wherein the data frame is stored in a register within each memory device of the plurality of memory devices.

\* \* \* \* \*